United States Patent [19]
Stelter

[11] Patent Number: 5,142,213
[45] Date of Patent: Aug. 25, 1992

[54] WYE-DELTA OPEN TRANSITION MOTOR STARTER WITH LEADING PHASE MONITOR AND METHOD OF USE

[75] Inventor: William F. Stelter, Libertyville, Ill.

[73] Assignee: Master Control Systems, Inc., Lake Bluff, Ill.

[21] Appl. No.: 686,185

[22] Filed: Apr. 16, 1991

[51] Int. Cl.⁵ .............................................. H02P 1/26
[52] U.S. Cl. ...................................... 318/771; 318/778
[58] Field of Search .............. 318/771, 778, 737, 785, 318/685

[56] References Cited

U.S. PATENT DOCUMENTS

| | | | |
|---|---|---|---|
| 3,624,471 | 11/1971 | Japp et al. | 318/225 R |
| 3,823,357 | 7/1974 | Sapper | 318/771 |
| 4,277,734 | 7/1981 | Uhrner et al. | 318/771 |
| 4,338,556 | 7/1982 | Hetzel | 318/685 |
| 4,425,538 | 1/1984 | Wills | 318/771 |
| 4,736,147 | 4/1988 | Shizhang | 318/771 |
| 4,833,460 | 5/1989 | Sabo | 340/658 |

OTHER PUBLICATIONS

Avoiding Switching Transient Damage in Motor Circuits by R. L. Nailen, P. E. Consulting-Specifying Engineer, Mar. 1987.
Why Wye-Delta Starters Cause Breakers to Trip: by Robert J. Wooddall, Electrical Apparatus, pp. 26-28, Nov. 1973.

Primary Examiner—William M. Shoop, Jr.
Assistant Examiner—John W. Cabeca
Attorney, Agent, or Firm—Jon Carl Gealow; James M. Wetzel

[57] ABSTRACT

A wye-delta open transition motor starter provided with a leading phase monitor and a method of using the same such that transient currents during the open transition are limited to acceptable magnitudes.

7 Claims, 3 Drawing Sheets

WYE-DELTA OPEN TRANSITION MOTOR STARTER WITH LEADING PHASE MONITOR AND METHOD OF USE

BACKGROUND OF THE INVENTION

1. Field of the Invention

This invention relates to an improved wye-delta open transition motor starter with leading phase monitor, and the method for using the leading phase monitor with the starter.

2. Background Information

Wye-delta motor starters have long been used for starting three-phase motors. The use of such starters results in the application of a reduced voltage to the motor windings during starting. By connecting the delta windings of the motor in wye for starting, the voltage on the motor windings is reduced by 33.3% and the starting current and torque by 66.6%. Once the motor reaches or approaches its operating speed, the wye connection is opened and a delta connection is made.

Since a direct short circuit would result if the delta connection of the windings was made before the wye connection was opened, a short delay is designed into the starter control circuit. This delay is customarily in the order of 2-4 line cycles or enough time for the motor starter wye contactor to drop out before the delta contactor closes. Such a delay solves the short circuit problem by momentarily leaving the windings in an open circuit condition. This mode of wye-delta starting is commonly referred to as "open transition" starting. Open transition starting is not commonly used because of the very large current transients which can occur when the delta contactor is closed. The peaks of such current transients can be over 23 times the full load current of the motor. These transients are primarily attributable to the phase displacement of the voltage induced in the motor winding from the line voltage to which the motor winding is to be connected.

As a result of the recognition of this transient current problem, another form of wye-delta starting called "closed transition" was developed. A "closed transition" starter connects a set of three resistors in series with the motor windings to the power lines to keep the motor winding voltages in phase with the power lines during the transition period. This solves the transient problem, but adds considerable bulk and expense to the starter.

Still another form of a wye-delta motor starter has been disclosed which is intended to overcome the current transient problems of an open transition wye-delta starter. U.S. Pat. No. 3,624,471 issued Nov. 30, 1971 sets forth a wye-delta starter having contactors which are progressively and in a timed sequence actuated to change the connection of the motor windings from wye to delta by varying the winding connections in such a way that at least one winding is energized at all times. Thus, the only known alternatives to "open transition" starting, which introduces high transient currents, are those providing a closed or a modified closed transition, both of which alternatives add circuit elements which are bulky and expensive.

SUMMARY OF THE INVENTION

Accordingly, it is an object of this invention to develop a wye-delta motor starter, primarily for 15-400 horsepower induction motors, which has the simplicity and low cost of an "open transition" type wye-delta starter, but which reduces the transition transient current caused by "open transition" wye-delta starting to an acceptable level, typically less than the maximum first half cycle locked rotor current of the motor to be started. When a three-phase motor is started with its windings connected in a wye configuration, the wye voltage on a motor winding may either lead or lag, by 30 degrees, the delta line voltage to be applied to the motor winding. The phase relationship depends on the connections made between the winding and the lines in both the wye and delta connections, and the direction of rotation of the motor.

Once the motor winding wye connections are disconnected during an open transition, the motor will immediately begin to lose speed. This loss of speed changes the frequency of the induced motor winding voltage, with a resultant change in the phase relationship between the induced motor winding voltage and the line voltage. If the motor winding voltage happens to lead the line voltage by 30 degrees, the motor voltage could lose up to 103 degrees in phase shift during the open transition and still be within 73 degrees of being in-phase with the line voltage when the delta run contactor is closed. Conversely, if the motor winding voltage happens to lag the line voltage by 30 degrees and loses the same 103 degrees in phase shift during the open transition, the motor voltage would be 133 degrees out of phase with the line voltage when the delta run contactor is closed. If the phase shift is limited to approximately 73 degrees, the closing voltage will not exceed the line-to-line voltage during an open transition, and thus the transient currents will be kept below that of the first half cycle locked rotor current of the motor.

Thus, if the motor winding connections to the power lines and the direction of rotation of the motor could be positively determined, open transition starting would be possible. However, the National Electrical Manufacturers Association Standard for Motors, NEMA MG-1, does not specify a direction of rotation for three phase induction motors. The standard only specifies that the motor must be reversible in the field. Therefore, the direction of a three phase induction motor can be either clockwise or counter clockwise for the same phase sequence connection of the motor windings to the power lines. None of the major motor manufacturers will guarantee a direction of rotation relative to a particular phase sequence connection of the power lines to the motor windings. Further, at least one major motor manufacturer has stated that it has no interest in determining the direction of rotation relative to the phase sequence of the power line connections to the motor windings. That manufacturer does not perform a test to determine a standard direction of rotation of the motor relative to the phase sequence of the line connections to the motor windings.

Therefore, since the direction of rotation of the motor relative to the phase sequence of the line connections is not provided by the manufacturer, and since an inspection of the motor will not reveal whether the motor voltage will lead or lag the line voltage, open transition starting has not been widely used. However, if the phase relationship of the induced motor voltage and the line voltage can be readily determined when the motor is installed, such that the line connections can be changed to give the desired phase relationship, then open transition starting would be desirable.

To keep the phase shift within the desired limits, it is also necessary to take into account the open transition time, the inertia of the motor and attached load, and the deceleration torque of the load, which in a particular instance may be a pump.

Thus, in accordance with this invention a leading phase monitor is provided which will indicate the phase relationship between the induced motor winding voltage and the line voltage, during an open transition. Having determined the lead/lag state of the induced motor voltage, relative to the line voltage, it may be found necessary to change the relationship to that desired. In accordance with this invention a method for changing the lead/lag status of the motor voltage in the field without changing the direction of rotation of the motor is provided, such that open transition starting can be utilized.

DETAILED DESCRIPTION OF THE PREFERRED EMBODIMENT

Figure 1:
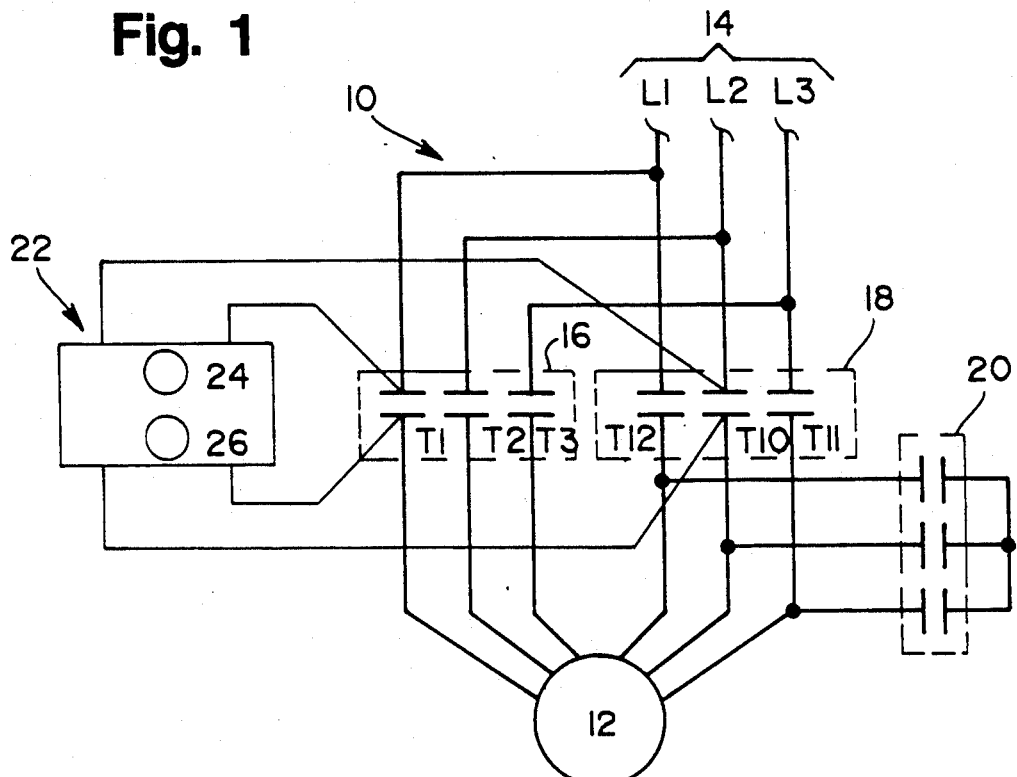
FIG. 1, is a schematic diagram of a wye-delta open transition, three-phase motor starter, including the leading phase monitor of this invention.

Referring to FIG. 1, a wye-delta motor starting circuit 10 is shown for energizing a three phase motor 12 from a three phase power source 14. The three phase motor 12 is shown as having six electrical connections for energizing the motor windings; T1, T2, T3, T10, T11 and T12. The three phase power source 14 includes lines L1, L2 and L3 which are connected to three phase contactors 16 and 18 to energize the motor in the wye starting and delta run configurations. Three phase contactor 16 provides for the connection of motor terminals T1, T2 and T3 to lines L1, L2 and L3 respectively. Three phase contactor 18 provides for the connection of motor terminals T10, T11, and T12 to lines L2, L3, and L1 respectively. A third three pole contactor 20 is provided to connect motor terminals T10, T11 and T12 to each for wye starting of the motor.

Motor 12 is started by closing the contacts of the three pole contactors 16 and 20, with the contacts of contactor 18 remaining open. In accordance with this invention, a leading phase monitor 22 is utilized to compare the phase relationship of the motor voltage appearing between motor terminal T10 and line L1, and with that appearing between lines L1 and L2, as the motor is brought up to its operating speed. The leading phase monitor 22, a preferred embodiment of which will be hereinafter described, includes indicators 24 and 26. As the motor 12 is brought up to operating speed with the contactors 16 and 20 closed and contactor 18 open, the indicators 24 and 26 will provide an indication of whether the motor voltage appearing between terminal T10 and line L1 is leading or lagging the voltage appearing between lines L1 and L2.

The motor 12 having been brought up to operating speed with contactors 16 and 20 closed, and contactor 18 open, contactor 20 is opened. After an open transition period of 2-4 line cycles following the opening of contactor 20, the contacts of contactor 18 are closed to connect the windings of the motor 12 in a delta run configuration.

If the indicators 24 and 26 of the leading phase monitor 22 displayed that the motor voltage appearing between terminal T10 and line L1 lead the voltage appearing between lines L1 and L2, the open transition from the wye to the delta connection will be accomplished without the occurrence of undesirable large transient voltages and currents. However, if the indicators 24 and 26 or the leading phase monitor 22 show that the motor voltage appearing between terminal T10 and line L1 is lagging the voltage appearing between lines L1 and L2, undesirably large transient currents will be drawn from the power source 14 by the out of phase motor windings in motor 12.

Figure 2:
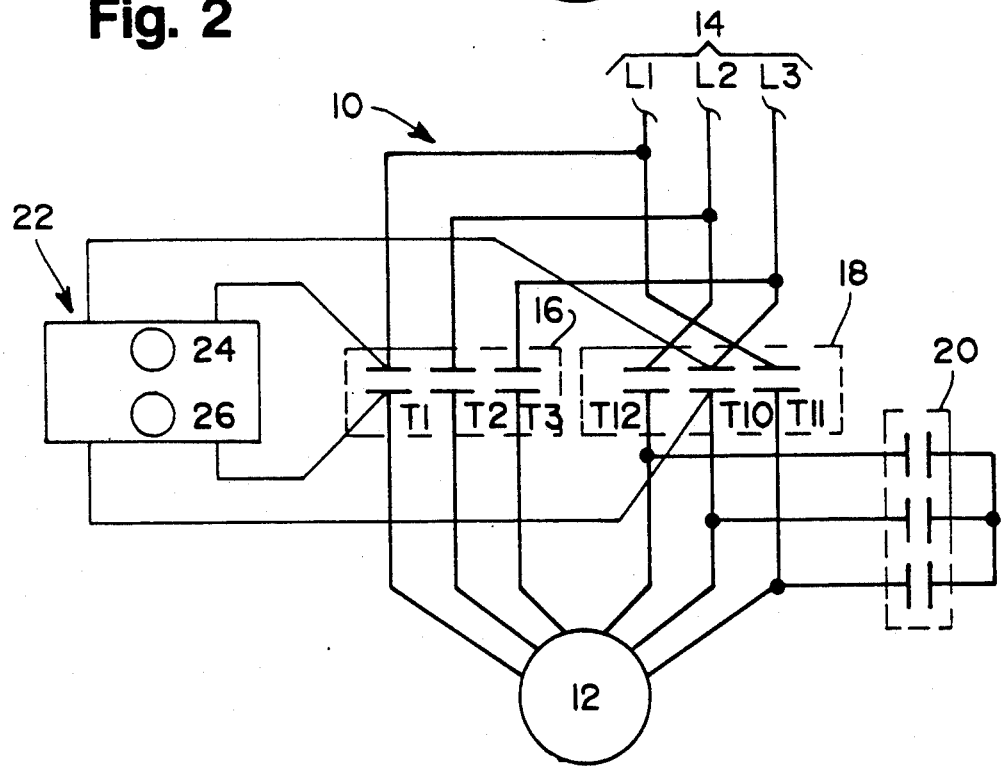
FIG. 2, is a schematic diagram of a wye-delta open transition, three-phase motor starter, including the leading phase monitor of this invention as shown in FIG. 1, with power lines rotated to provide the desired leading phase relationship of the motor voltage and the line voltage.

To eliminate such undesirably large transient currents the connection of lines L1, L2, and L3 to the contactor 18 are rotated to the positions shown in FIG. 2. If the motor is again started by closing the contacts of contactors 16 and 20 with those of contactor 18 remaining open, the leading phase monitor 22 will display that the motor voltage appearing between terminal T10 and line L1 is leading the voltage appearing between lines L1 and L3. As previously stated, the open transition from the wye to the delta connection will be accomplished without the occurrence of undesirably large transient currents. Further, since the same phase sequence is maintained, the direction of rotation of the motor 12 is not changed.

Figure 3A:
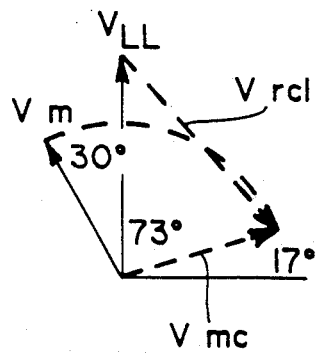
FIGS. 3a and 3b, are diagrams showing the phase relationship of the induced motor winding voltage and the line voltage, with for the induced motor voltage leading and lagging respectively.
Figure 3B:
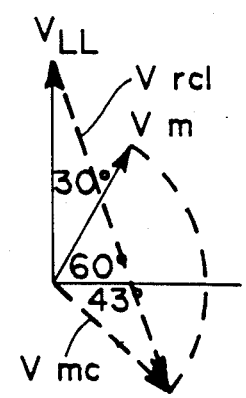

Referring to FIGS. 3a and 3b, the phase relationship of the voltage generated in the motor winding during an open circuit transition with respect to the corresponding line-to-line voltage will be explained. When a motor is started in a wye configuration, the voltages developed in the motor windings may either lead or lag the line-to-line voltage in a delta connection by 30 degrees, depending on the connection of the motor windings to the power lines and the direction of rotation of the motor. When the contacts of contactor 20 are opened for an open transition from the wye starting to the delta run connections, the motor speed begins to fall. This decrease in speed of the motor causes a drop in the frequency of the motor voltage and a change in the phase relationship between the motor generated voltage and the line voltage. If the motor voltage as represented by the phasor $V_M$ in FIG. 3a leads the line voltage represented by the phasor $V_{LL}$, the motor voltage could lose 103 degrees in phase shift during the open transition as represented by the phaser $V_{RCL}$ and still close within 73 degrees of being in phase with the line voltage $V_{LL}$. Conversely, if the motor voltage $V_M$ lags the line voltage $V_{LL}$ by 30 degrees as shown in FIG. 3b, and again loses 103 degrees in phase shift as set forth with respect to FIG. 3a, the motor will close with the motor voltage as represented by the phaser $V_{RCL}$ 133 degrees out of phase with the line voltage.

The significance of the phase relationship of the line-to-line and induced motor voltage on the magnitude of the transients developed during an open transition will be further explained by again making reference to FIGS. 3A and 3B. Referring to FIG. 3a, if the per unit value of the magnitude of the line-to-line voltage $V_{LL}$ is taken as 1.0, and the motor voltage $V_M$ as 0.577, the magnitude of the voltage $V_{RCL}$ across the contactor contacts at closing will be approximately 1.0 unit. Thus $V_{RCL}$ will have the same magnitude as the line voltage and will lag it by 73 degrees. With the reclosing voltage $V_{RCL}$ limited in magnitude to that of the line voltage, the transient currents will not exceed the first half cycle locked rotor current for the motor as determined by the following formulas:

$$V_{RCL} = V_{LL} - V_{MC}$$
$$= 1.0 \lfloor 90° - 0.577 \lfloor 17°$$
$$= j1.0 - j0.169 - 0.552$$
$$= 0.552 + j0.831$$
$$= 0.998 \lfloor -56.4$$

$$\text{Locked Rotor Impedance } Z_M = \frac{V_{LL}/\sqrt{3}}{6 \times FLA} =$$

$$\frac{1/\sqrt{3}}{6 \times 1} = 0.0962$$

Where motor $FLA = 1$ BASE
Maximum Theoretical Offset (off) = 2.0

$$\text{First Half Cycle Locked Rotor Current} = \frac{V_{LL}/\sqrt{3}}{Z_M} \times OFF \times 1.414$$

$$= \frac{1/\sqrt{3}}{.0962} \times 2 \times 1.414 = 16.97 \, PU$$

$$\text{Peak Open Transition Transient Current } (POTTC) = \frac{V_{RCL}/\sqrt{3}}{Z_M} \times OFF \times 1.414$$

For $V_{RCL} = 0.998$; $POTTC = 16.94 \, PU$

However, if the motor voltage upon opening of the wye connector lags the line voltage as shown in FIG. 3b, the reclosing voltage would be of a magnitude of 1.5 units with a 133 degree lag with respect to the line voltage. Calculating the peak open transient current by the formulas set forth above, results in a peak open transition transient current of 24.71 units, far exceeding the first half cycle locked rotor current:

$$V_{RCL} = V_{LL} - V_{MC}$$
$$= 1.0 \lfloor 90° - 0.577 \lfloor -43°$$
$$= j1.0 + j0.394 - 0.422$$
$$= -0.422 + j1.394$$
$$= 1.456 \lfloor -73.2°$$

Figure 4A:
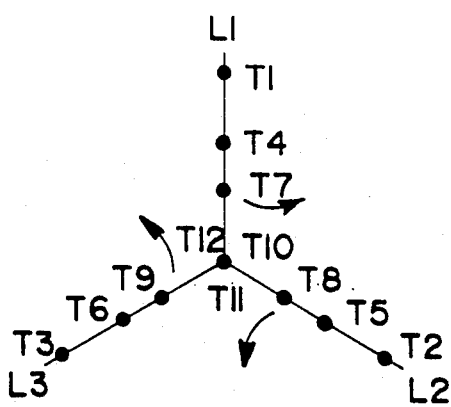
FIGS. 4a and 4b, are diagrams of the motor windings in wye and delta connections respectively, for a first transition of the windings from the wye to the delta connection.
Figure 4B:
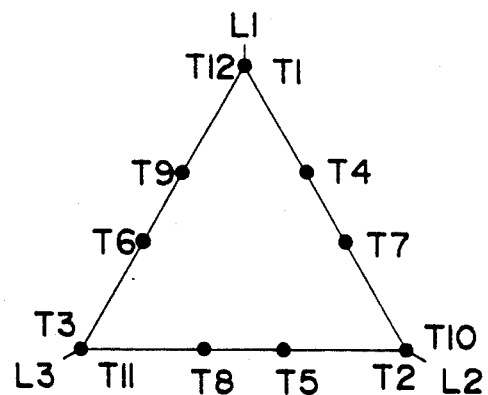

Referring to FIGS. 4a and 4b, the arrangements of the windings of a three phase motor for a first transition of the windings from a wye to a delta connection are shown. As illustrated, the motor winding for each phase is shown to consist of two sections. Forming the winding in two sections permits the motor to be used for either 220-240 or 440-480 volts service depending upon whether the windings are connected in series or parallel. Referring to the wye connection shown in FIG. 4a, the two segments of the winding connected to line L1 are represented by T1-T4 and T7-T10. Upon opening the wye contactor so as to separate contacts T10, T11 and T12 as shown in FIG. 4a, the windings connected to the lines are in effect rotated in the direction shown by the arrows to form the connections to the line shown in FIG. 4b. The connections shown in FIG. 4b correspond to those which result in FIG. 1 when the contactors 16 and 18 are closed.

Figure 5A:
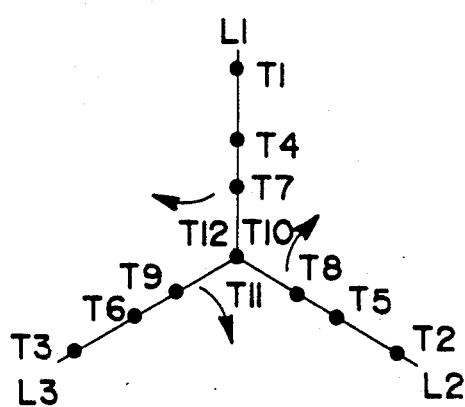
FIGS. 5a and 5b, are diagrams of the motor windings in wye and delta connections respectively, for a second transition of the windings from the wye to the delta connection.
Figure 5B:
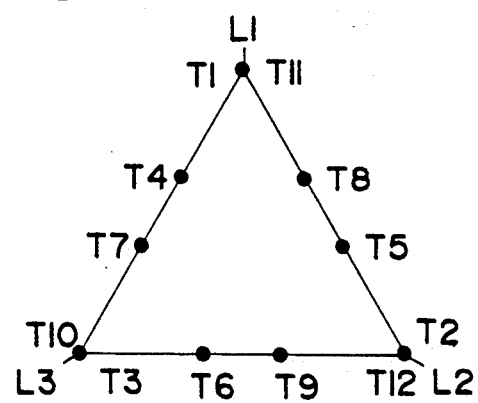

Similarly, FIGS. 5a and 5b shows the transition of the winding segments from the wye connection shown in FIG. 5a to the delta connection shown in FIG. 5b when the windings are rotated in the direction shown by the arrows in FIG. 5a, which is the direction opposite that shown in FIG. 4a. The connections shown in FIG. 5b correspond to those which result in FIG. 2 when the contactors 16 and 18 are closed.

Thus, the leading phase monitor is used to indicate the lead/lag state of the motor voltage relative to the line voltage, such that if necessary it can be changed in the field without changing the phase sequence or rotation of the motor. When the motor is used to drive a pump, transient current reductions of approximately 40% have been obtained by using the following criteria to determine if the open transition transient current will be less than the first half cycle locked rotor starting current. Having established a desired lead/lag relationship using the leading phase monitor, the starting pump horsepower (SPH) is limited as follows:

$SPH = (WRR \times 100)/(0.36 \times RMH)$ for 1800 RPM motors $SPH = (WRR \times 100)/(10.09 \times RMH)$ for 3600 RPM motors.

Where WRR equals the rotational moment of inertia for the pump and motor combination and RMH equals the Rated Motor Horsepower.

Further, the motor is sized to accelerate the Starting Pump Horsepower (SPH) up to 95% of synchronous speed.

Figure 6:
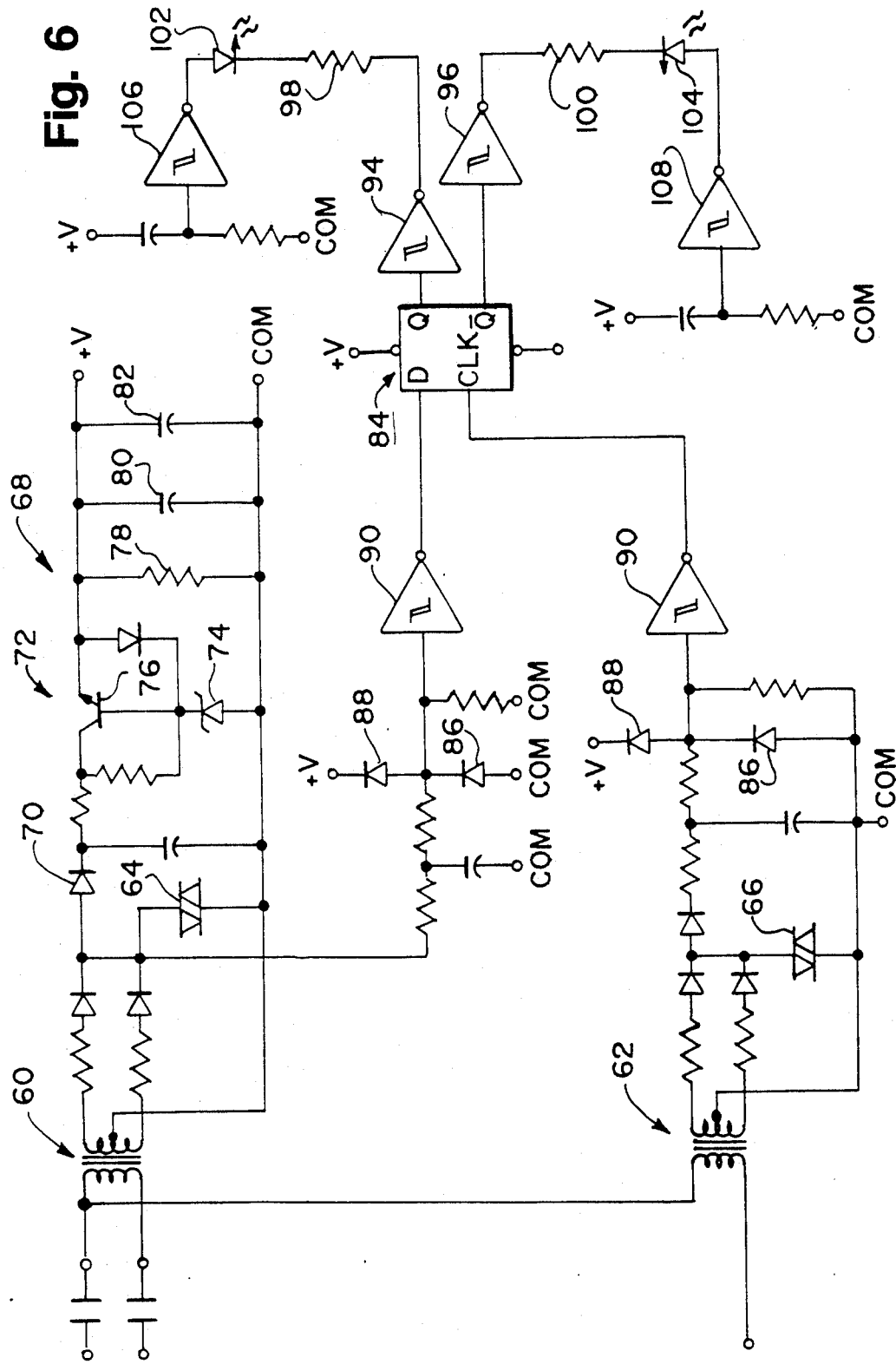
FIG. 6, is a schematic diagram of a preferred form of the leading phase monitor of this invention.

Referring to FIG. 6, a schematic diagram of a preferred form of the leading phase monitor shown as 22 in FIG. 1 will be described. The leading phase monitor 22 is energized through a pair of transformers 60 and 62. The A/C outputs of the isolation transformers 60 and 62 are processed by identical circuits and applied to the D and Clock terminals respectively of a D type positive edge trigger flip-flop 84. The circuits for processing the signals applied to the D and Clock terminals of the flip-flop each comprise a voltage clamping means, formed by a pair of diodes 86 and 88, and a TTL Schmitt trigger inverter 90. Transient suppressors 64 and 66 are connected to the output winding of transformers 60 and 62 respectively to protect the circuit elements of the leading phase monitor.

The output of transformer 60 energizes a regulated direct current power supply 68. The direct current power supply includes a rectifier 70, a voltage regulator 72 comprising a zener diode 74 and a transistor 76, and a filter and stabilizing circuit including resistor 78 and capacitors 80 and 82. One of the capacitors typically being of the electrolytic type and of relatively high capacitance, and the other of the ceramic type and of relatively low capacitance. The positive output voltage V, which in a preferred embodiment is 5 volts, is applied to the terminals identified with the letter V. The five volt supply is provided across the pair of diodes 86 and 88 to clamp the input to the inverters 90 to five volts. The output of the inverters 90 are applied to the Clock and D input of the flip-flop 84. The Q and $\overline{Q}$ outputs of the flip-flop 84 are applied through inverters 94 and 96 respectively to series circuits consisting of resistors 98 and 100 and light emitting diodes 102 and 104, and inverters 106 and 108 respectively.

A rising voltage applied to the input of inverters 90 causes their output to go low. With the input to transformer 60 representing the line voltage and that to transformer 62 representing the motor winding voltage, if the line voltage is leading the motor voltage, the input to the D terminal of the flip-flop 84 will go low before the input to the clock terminal. When a positive edge signal is provided to the clock terminal, with the D terminal already low, the output of the Q terminal will be low, while that of the $\overline{Q}$ terminal will be high. Thus, the upper light emitting diode 102 will be off and the lower light emitting diode 104 will be on to indicate that the motor voltage is lagging the line voltage. Conversely, if the motor voltage is leading the line voltage, the positive edge trigger to the Clock terminal will precede that to the D terminal, such that the Q output will be high and the $\overline{Q}$ output will be low. Thus, the upper light emitting diode 102 will be on and the lower light emitting diode 104 will be off to indicate that the motor voltage is leading. While a particular circuit for the leading phase monitor has been described, other circuits could be used.

It should be apparent to those skilled in the art that what has been described is considered at present to be preferred embodiment of the wye-delta open transition motor starter with a leading phase monitor and method of using the same of this invention, in accordance with the patent statues, changes may be made in the starter with leading phase monitor and method without actually departing from the true spirit and scope of this invention.

The appended claims are intended to cover all such changes and modifications which fall in the true spirit and scope of this invention.

I claim:

1. A method of connecting a three-phase motor having at least one winding for each phase, to a three phase power supply for wye starting and delta run energization, with the each of said windings having at least a first and a second terminal, said windings being open circuited during the transition from wye to delta connection comprising the steps of:
   a) connecting said first terminals of each of said windings to each other through a first three pole contactor to provide for wye starting of the motor,
   b) connecting each said second terminal of each of said windings to a different one of the phases of the power supply through a pole of a second three pole contactor, such that when said breaker contacts are closed, said motor is energized in a wye configuration for starting,
   c) connecting each of said first terminals of each of said windings to a different one of the phase of the power supply through a pole of a third three pole contactor, such that when the contact of said first and third contactors are both closed, said motor is energized for running in a delta configuration,
   d) connecting a phase comparison monitoring means between said first terminal of a selected one of said windings and a selected one of the phases of the power supply,
   e) closing said first three pole contactor to start said motor, and thereafter opening said contactor when said motor has reached a desired speed, motor developed voltages appearing on each of said first terminals of each of said windings when said contactor is opened,
   f) comparing the phase relationship between a phase of the power supply to which said first terminal of said selected one of said windings is to be connected, and the motor developed voltage on said first terminal of said selected one of said windings to the open circuited motor winding, while said motor windings are energized in a wye configuration for starting,
   g) when said motor developed voltage leads said phase voltage, connecting said selected phase to one of the contactors of said third three pole contactor, such that when the contactor is closed, said selected phase will be connected to said first terminal of said selected one of said windings,
   h) when said motor developed voltage lags said phase voltage, connecting another one of said phases other than said selected phase to one of the contacts of said third three pole contactor, such that when the contactor is closed, said phase will be connected to said first terminal of said selected one of said windings, such that as said motor speed decreases while the motor windings are open circuited, said motor developed voltage will first lead and then lag said line voltage, such that the phase angle difference between the voltages appearing on the third contactor contacts to be closed on each other will be minimized, thereby minimizing the transient current occurring upon closing of the third contactor to energize said motor in a delta run connection.

2. The method of connecting a three-phase motor to a three-phase power supply set forth in claim 1, wherein when said another one of said phases other than said selected phase is connected to one of the contacts of said three pole contactor, the direction of rotation of said energized motor is not changed.

3. The method of connecting a three-phase motor to a three-phase power supply set forth in claim 1, wherein the starting horsepower of said motor is limited to a predetermined constant times the rotational moment of inertia of said motor and load divided by said motors rated horsepower.

4. The method of connecting a three-phase motor to a three-phase power supply set forth in claim 3, wherein for said motor having a synchronous speed of 1800 RPM, said constant is not greater than approximately 278.

5. The method of connecting a three-phase motor to a three-phase power supply set forth in claim 3, wherein for said motor having a synchronous speed of 3600 RPM, said constant is no greater than approximately 1100.

6. The method of connecting a three-phase motor to a three-phase power supply set forth in claim 1, wherein the peak transient currents in said motor windings do not exceed said motors first half cycle locked rotor current.

7. A three-phase motor starter for energizing a three phase motor from a three-phase power supply for wye starting and delta run energization, said motor having three windings, each of which has at least a first and a second terminal, said windings being open circuited during the transition from wye to delta connection, said starter comprising:
   a) a first three pole contactor connected to said first terminals of each of said windings for connecting said first terminals to each other to provide for wye starting of the motor,
   b) a second three pole contactor for connecting each of said second terminals of each of said windings to a different one of the phases of the power supply, such that when said contactor contacts are closed, said motor is energized in a wye configuration for starting,
   c) connecting each of said first terminals of each of said windings to a different one of the phases of the power supply through a pole of a third three pole contactor, such that when the contacts of said first and third contactors are both closed, said motor is energized for running in a delta configuration,
   d) a phase comparison monitoring means for monitoring the phase relationship between said first terminal of a selected one of said windings and a selected one of the phases of the power supply, such that when said first three pole contactor is closed to start said motor, the phase relationship between said selected one of the phases of the power supply and said first terminal of said selected one of said windings is provided by said phase comparison monitoring means, such that if said motor developed voltage leads said line voltage, said selected phase is connected to said first terminal of said selected one of said windings such that as said motor speed decreases while the motor windings are open circuited, said motor developed voltage will first lead and then lag said line voltage, such that the phase angle difference between the voltages appearing on the contacts to be closed on each other will be minimized, thereby minimizing the transient current occurring upon closing of the contactor to energize said motor in a delta run connection.

* * * * *

UNITED STATES PATENT AND TRADEMARK OFFICE
CERTIFICATE OF CORRECTION

PATENT NO. : 5,142,213

DATED : August 25, 1992

INVENTOR(S) : Stelter, William F.

It is certified that error appears in the above-identified patent and that said Letters Patent is hereby corrected as shown below:

Column 5, line 61 insert

-- For $V_{RCL}$ = 1.456; POTTC = 24.71 PU --

Signed and Sealed this

Twenty-fourth Day of August, 1993

Attest:

BRUCE LEHMAN

Attesting Officer     Commissioner of Patents and Trademarks